United States Patent [19]

Drost et al.

[11] Patent Number: 4,572,521
[45] Date of Patent: Feb. 25, 1986

[54] T-SEAL FOR POLYMERIC EXTRUSION SYSTEM

[75] Inventors: Adrian D. Drost, Roswell, Ga.; Edward H. Ruscher, Appleton, Wis.

[73] Assignee: Kimberly-Clark Corporation, Neenah, Wis.

[21] Appl. No.: 643,570

[22] Filed: Aug. 23, 1984

[51] Int. Cl.$^4$ .............................................. F16J 15/08
[52] U.S. Cl. ................................. 277/167.5; 277/190; 277/236
[58] Field of Search .................. 277/167.5, 236, 190, 277/191

[56] References Cited

U.S. PATENT DOCUMENTS

| | | | |
|---|---|---|---|
| 1,483,499 | 2/1924 | Allee | 277/167.5 |
| 2,413,308 | 12/1946 | Arnold | 277/167.5 |
| 3,509,598 | 5/1970 | Van Den Biggeaar | 18/8 |
| 3,553,773 | 1/1971 | Heijnis | 18/8 |
| 3,768,661 | 10/1973 | Coates | 210/449 |
| 3,802,821 | 4/1974 | Mott | 425/192 |

Primary Examiner—Robert I. Smith
Attorney, Agent, or Firm—William D. Herrick

[57] ABSTRACT

An improved sealing means is provided in a multiple component assembly for delivering a fluid material under pressure which includes a lower fluid material container section having a cavity formed therein and provided with at least one outlet orifice formed in an outlet surface of the lower fluid material container section, which outlet orifice communicates with the cavity, an upper fluid material container section formed in at least two parts which are arranged in juxtaposed mating relationship and which define a cavity therein, one of the juxtaposed parts having a fluid material inlet in an inlet surface, the inlet communicating with the cavity in the upper fluid material container section. The upper fluid material container section is mounted in superposed mating relationship on the lower fluid material container section and the upper fluid material container cavity is arranged to communicate with the lower fluid material container cavity and thereby define a fluid material chamber. A first sealing means is provided between the mating surfaces of the lower fluid material container section and the upper fluid material container section and is arranged surrounding the fluid material chamber. A second sealing means is provided between each of the at least two parts of the upper fluid material container section adjacent the cavity in the upper fluid material container.

5 Claims, 8 Drawing Figures

T-SEAL FOR POLYMERIC EXTRUSION SYSTEM

TECHNICAL FIELD

The present invention relates to a sealing system positioned between component parts in an extrusion apparatus. More particularly, the invention relates to an improved two-part sealing system to contain fluids under pressure within an extrusion apparatus formed from at least three separate structures.

BACKGROUND ART

Apparatus which are commonly employed to contain or transfer fluids under pressure, such as polymer distributor sections of spunbonded spinpacks or melt blown die bodies, frequently join component parts with seals interposed between mating or mounting surfaces to obviate seepage of fluid under high pressure from between the mounting surfaces. The washers or gaskets used as sealing members are generally of a flat configuration arranged with the widest planar surface of the seal in contact with each adjacent mounting surface of the component parts. The sealing member is generally formed from a metal, either the same or a different metal than that used in the component parts.

In apparatus employing such metal-to-metal surface contact seals, throughput rates are severely limited by the maximum pressure which may be employed without leakage occurring. In such applications, this limit is frequently below 1,000 psi. Often, in an attempt to increase effective sealing between interfaces, the bolts securing the component parts are subjected to high torque loading. In many instances, the loading exceeds the strength of the bolts employed. As a result, the extrusion pressure and, therefore, the throughput rate which may be practically attained is limited by the strength of the assembling bolts and the sealing systems used in such apparatus.

DISCLOSURE OF THE INVENTION

The present invention provides a multiple, generally two, part sealing system for use in multiple component apparatus which contain or transfer hydraulic fluids, particularly liquids, under pressure. The sealing system of the present invention is particularly suited for containing hydraulic pressures within a cavity formed by separate structures used in polymer distributor assemblies, such as in spunbonded spinpacks or in melt blown die bodies, in which polymeric material, either in molten form or in solution, is extruded from an extrusion assembly, such as a die head or, particularly, a spinneret.

The sealing system of the present invention is as capable of providing effective sealing in the aforementioned types of hydraulic systems within the range of about 1,000 to about 3,000 psi as it is at pressures below 1,000 psi.

The system is expected to find most widespread application in polymeric distribution systems, such as three-component systems, particularly including those having a spin plate mounted beneath a two-part distributor block such that the component parts define a cavity within the assembly. The distributor block is formed from two juxtaposed portions such that the three component parts of the assembly define an inverted "T"-shaped interface. The sealing system of the present invention, arranged between the mating surfaces of the component parts of such a three-part system, also has an inverted "T"-shaped configuration when viewed on end. The present sealing system may also be employed, with some modification, in polymer distribution systems in which a breaker plate is arranged intermediate a spin plate and a distributor block.

In a typical extrusion assembly formed from a lower fluid material container section or spin plate and an upper fluid container section or distributor block formed by two juxtaposed parts, each of the sections or parts are arranged in mating or mounting relationship. The sealing system of the present invention employs a first sealing means which comprises an endless ribbon-shaped sealing member placed between the upper and lower fluid material container sections arranged with its narrow edge portions inserted in commensurately shaped endless grooves formed in the mating surfaces of the upper and lower fluid material container sections. The endless sealing member is arranged surrounding the fluid material chamber defined within the body of the assembly. The T-shaped sealing means also includes a second sealing member which comprises a ribbon-shaped sealing member of limited or finite length, disposed substantially perpendicular to the endless sealing member and having its ends overlappingly contacting opposed portions of the endless sealing member. Like the endless sealing member, the ribbon-shaped sealing member of finite length is arranged in opposing grooves formed in abutting surfaces of each part of the upper fluid material container section, which grooves surround and are arranged adjacent the fluid material chamber defined by cavities formed in the component parts of the assembly.

BEST MODES FOR CARRYING OUT THE INVENTION

As employed herein, the terms "upper" and "lower" are used to describe relative positions when an assembly to contain or transfer fluids under pressure, such as a polymeric distribution assembly, is mounted such that a distributor block, or the component parts thereof, is arranged above a lower transfer or extrusion section, such as a die tip, a spinneret plate, or the like, having a generally centrally disposed fluid material chamber defined by cavities in the upper distributor block and the lower section. In such an arrangement, the fluid or polymeric outlet or extrusion openings, which communicate with the fluid material chamber, are formed in the lower surface of the spinneret plate or die tip. The distribution assembly, however, may have any other orientation in which the fluid outlet orifices are at some position other than at the bottom of the assembly. Thus, in some melt blown polymer extrusion apparatus, the assembly is oriented so that streams of polymeric material emanating from the extrusion openings in a die head move in a horizontal direction and are deposited on a collection surface. In such an arrangement, with respect to the present invention, the die head would be identified as a lower section even though the other components are arranged in juxtaposed, rather than superposed, relationship.

Figure 1:
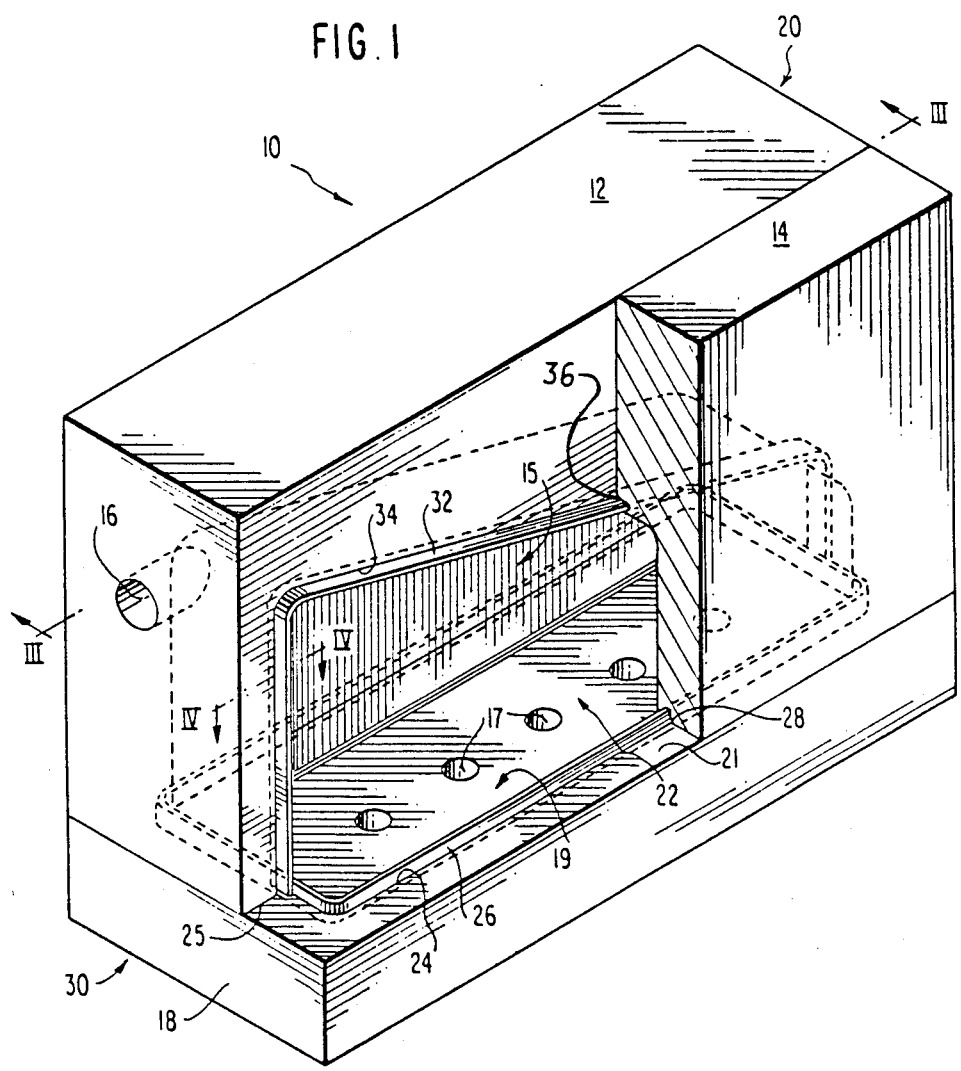
FIG. 1 illustrates in a partially broken away perspective view the T-shaped sealing system of the present invention within a polymeric distribution assembly.

As shown in FIG. 1, a fluid material distribution system 10, such as the type to distribute polymeric materials as, for example, those used in spun-bonded spinpacks or melt blown die bodies, is illustrated. The distribution assembly is formed from an upper fluid material receptacle or container section 20 and a lower fluid material receptacle or container section 30. The upper fluid material container section 20 is formed in two parts 12 and 14 which are arranged in juxtaposed mating relationship and define a cavity 15 for receiving and distributing fluid material, such as a molten polymeric material or a solution of a polymeric material in a suitable solvent. The fluid material is introduced to the cavity formed in the juxtaposed parts of the distributor block 20 through an inlet 16 formed in a wall of one of the fluid material container section parts 12, the inlet being in communication with the cavity 15.

Mounted below and in mating contact with the upper fluid material container section 20 is a lower fluid material receptacle or container section 30, such as a die head, spinneret or spin plate, combination breaker plate and spin plate, or the like. In the embodiment illustrated in the FIG. 1, the lower fluid material container section takes the form of a spin plate 18. The lower fluid container section also has a cavity 19 formed therein which communicates with outlet or extrusion orifices 17 formed in the bottom of the lower fluid material container section 30. The upper fluid material container section 20 is mounted in superposed and mating relationship on the lower fluid material container section 30 such that the lower or first cavity 19, formed in the lower fluid material container section, and the upper or second cavity 15, defined by the inner walls of the upper fluid container section parts, communicate to define a fluid material chamber 22 within the distributor assembly.

The components of the distributor assembly, such as the upper and lower fluid material container sections or the juxtaposed parts 12 and 14 of the upper fluid material container section, may be secured to one another by any conventional means, such as clamps or, as commonly used, bolts (not shown). The clamps or bolts generally provide little or no sealing pressure but merely support or maintain the mounting surfaces of the component parts in mating contact.

Figure 2A:
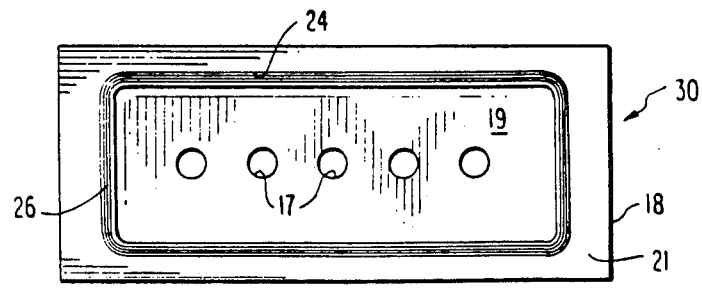
FIGS. 2a and 2b are plan views of an endless sealing member within a lower portion and upper portion, respectively, of a polymeric distribution assembly.
Figure 2B:
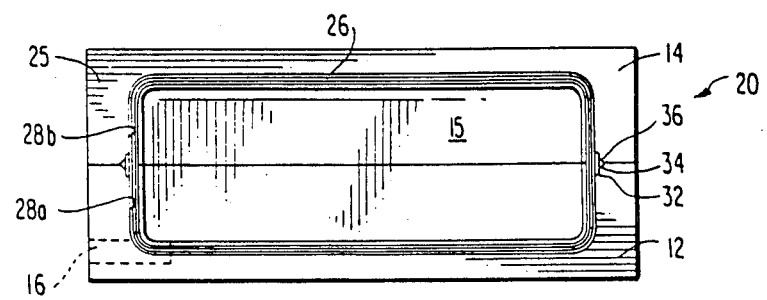

The material which is extruded or transferred by the distribution assembly, such as molten polymeric material or a solution of polymeric material, enters the distributor assembly, specifically cavity 15, generally under pressure, through inlet opening 16 (FIG. 1). The fluid material is then distributed throughout the fluid material chamber 22 and is forced out the outlet orifices 17 formed in the extrusion surface of the lower fluid material container section. With either conventional seals or no seals, the fluid material, being under high pressure, tends to seep from the interfaces formed at the mounting surfaces between the upper and lower fluid material container sections or from between the juxtaposed parts of the upper fluid material container section. The improvement provided by the present invention obviates such leakage. As shown in FIGS. 1, 2a and 2b, an endless groove 24 is formed in the upper or mating surface 21 of the lower fluid material container section adjacent and surrounding the cavity 19 formed therein. A first or endless sealing member 26 fits within the endless groove 24 formed in the surface of the spin plate 18. In the lower mating surface 25 of the upper fluid material container section is formed an endless groove 28 commensurate in shape and dimensions to endless groove 24 and endless sealing member 26 such that the sealing member also engages this second endless groove 28 when the distribution assembly is fully assembled. It should be noted that although the second groove 28 is termed an "endless" groove, the slot or groove is actually formed in two segments 28a and 28b, one segment formed in each of the parts 12 and 14 such that their ends meet to form an endless or "continuous" groove when the distributor system is fully assembled. The second endless groove 28, like the first endless groove 24, is arranged adjacent and surrounding the cavity formed by the two juxtaposed parts of the upper fluid material container section.

Figure 3:
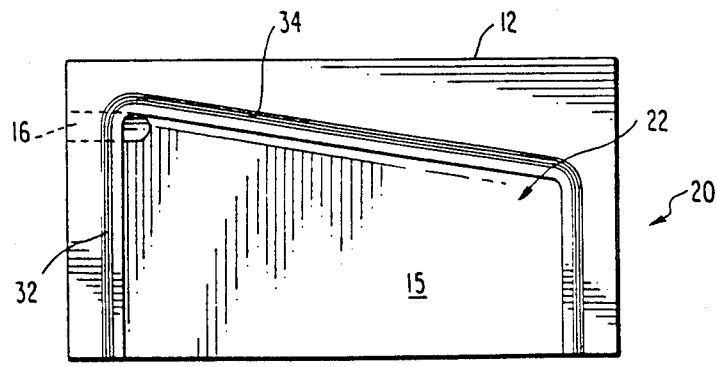
FIG. 3 shows in side elevation one part of the upper fluid material container section of a polymeric distribution assembly and a sealing member of finite length inserted therein taken along line III—III in FIG. 1.

As shown in FIGS. 1 and 3, a second sealing member 32 which, like the endless sealing member, is arranged to surround the fluid material chamber 22, is placed within two grooves 34 and 36, each having dimensions and a shape commensurate to the second sealing member 32. Each of grooves 34 and 36 is formed in those surfaces of the two parts 12 and 14, respectively, of the upper fluid material container section which mate with one another. Each of grooves 34 and 36 extends from the lower or mounting surface of the juxtaposed parts 12 and 14 at the interface formed between the upper fluid material container section 20 and the lower fluid material container section 30 at a location adjacent the fluid material chamber and continues around the fluid material chamber, terminating on the opposite side of the part of the upper fluid material container section at the lower or bottom surface of the juxtaposed part, also at the same interface formed between the upper and lower fluid material container sections.

Each of the sealing members is ribbon-shaped, having a rectangular cross section, and is preferably formed from a soft metal, such as copper, silver, aluminum, lead, or the like, or alloys of the foregoing. Preferred is aluminum since it provides an optimum coefficient of expansion in a heated steel distribution assembly. Particularly preferred is soft annealed aluminum which additionally assures contact of the seal with the bottoms of the grooves when pressed into place. The grooves into which the sealing members are placed may either have a generally wide "V-shaped" configuration in which the walls of the groove are, in cross-section, preferably straight, and intersect to form an included angle of up to about 90 degrees or, alternatively, the sealing member may be placed in a "U-shaped" groove, as illustrated in FIG. 4. In some instances in which a V-shaped groove is used, the groove may appear as an edge portion of the cavity, such as that shown in FIGS. 5a and 5b formed in the lower fluid container, with the endless sealing member fitting against a shoulder or recess formed therein.

Unlike conventional sealing members in which the longer cross sectional dimensions, that is, the widest sealing member surfaces or planes parallel to such surfaces, are oriented parallel to the mating surfaces of the component parts of the assembly or perpendicular to the central axis of the fluid material chamber or the normal direction of fluid flow, the seals of the present invention 26 and 32, having narrow edge portions or surfaces 42 and wide edge portions or surfaces 44, as shown in FIG. 4, are placed within the grooves such that the longer cross-sectional dimensions, that is, the wider sealing member surfaces or edge portions or planes parallel to such surfaces or edge portions 44 of the rectangular cross-section, are oriented substantially perpendicular to the mating surfaces in which the grooves are formed.

The edges or surfaces 44 of the sealing members 26 and 32 having the longer cross sectional dimensions or wider sealing member surfaces are designated herein as "inner" edges 44a when situated closest to the fluid material chamber and "outer" edges 44b when their proximity to the fluid material chamber is more remote. Likewise, corresponding surfaces of the inner and outer walls of each groove may also be designated "inner" or "outer".

The designation of grooves as being U-shaped is not intended to suggest that any portion of the cross-section of the groove which contacts the sealing member is curvilinear. Preferably, the groove is formed by straight surfaces, when viewed in section, which enclose angles where they intersect equal to or greater than 90 degrees as shown in FIG. 4. The type of groove used in each pair of mating surfaces may be of the same type as shown in FIG. 4 or a combination of different types of grooves may be used in each pair of mating surfaces. No matter which type of groove is used to receive the sealing member, the narrow edges 42 of the seal should contact the bottom of each groove 43 while the outer surface or edge 44b contacts at least a portion 45 of the outer surface of each of the groove portions 45 which are substantially perpendicular to the mating surfaces in which the grooves are formed. When a U-shaped groove is used, an interference fit is preferred between the sealing member and at least a portion of the walls of the groove.

Although both the upper and lower fluid material container sections 20 and 30, as well as both parts of the upper fluid material container section 12 and 14, may be in mating contact with each other on both the inner and outer sides of the sealing members, it is more important that the mounting surfaces contact one another exterior of the sealing member, that is, the side which is most remote from the molten polymer flow passage. Thus, should the fluid material, such as polymeric material in molten form or in solution, seep between the interface formed by the mounting surfaces adjacent the fluid material chamber 22 interior of the sealing members, the pressure exerted by the fluid material exerts a force on the sealing member, forcing it against the outer surfaces 45 of the grooves 34 and 36 or 24 and 28 and thereby increasing the sealing effect of the sealing member within the grooves. Generally, clamps, bolts or the like are used to secure the component parts of the assembly to one another. In addition, such securing means serve to exert a force on the narrow ends 42 of the seal. That is, the width of the seal, such as the dimension measured parallel to the surface 44, exceeds the combined depths of the two grooves into which the sealing member is placed. Thus, when the apparatus is assembled with the seal in place there exists a space between the mating surfaces 52 and 54 (FIG. 4a) prior to clamping. Tightening of the clamps or bolts generally tends to compress the seal somewhat.

Figure 4A:
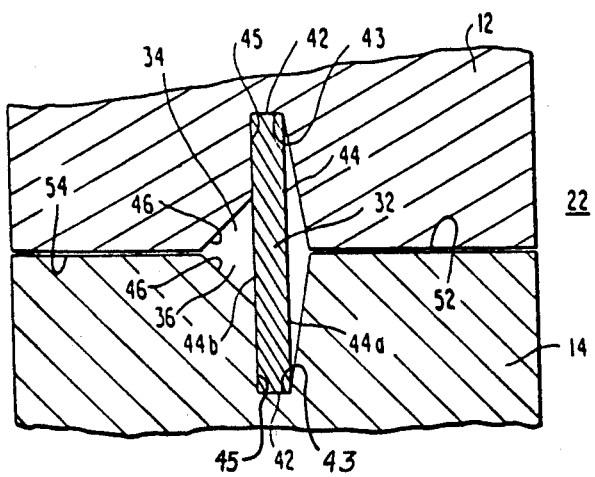
FIG. 4a shows in section one of the sealing members of the T-shaped sealing system of the present invention within a portion of a polymeric distribution assembly taken along line IV—IV in FIG. 1 assembled but in an unclamped arrangement.
Figure 4B:
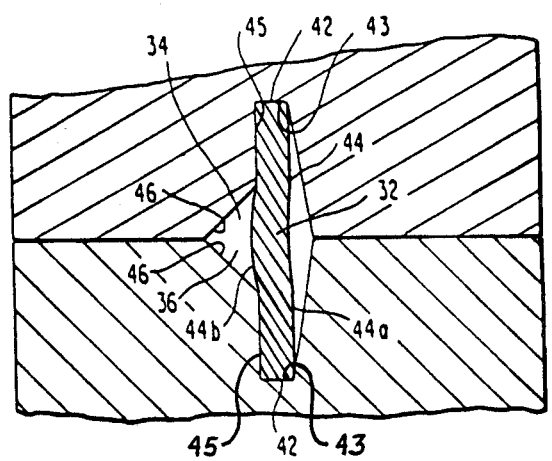
FIG. 4b shows a view similar to that in FIG. 4a but in a clamped arrangement in an assembly containing a fluid material at high fluid pressures.
Figure 5A:
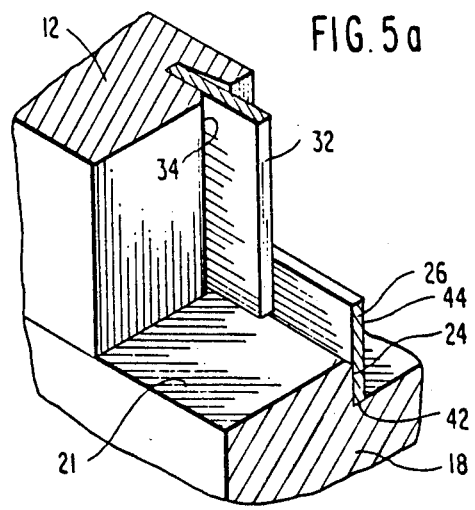
FIGS. 5a and 5b illustrate in perspective and in section, respectively, the relative positions and arrangement of the endless sealing member and an end of a sealing member of finite length within a fluid distribution system.
Figure 5B:
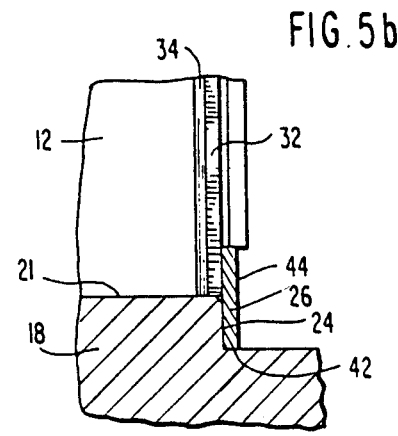

The effectiveness achieved by using the sealing system of the present invention may be improved further by providing, in a preferred embodiment, a bevel or chamfer 46 on the outer portion of each of the grooves, as shown in FIGS. 4a and 4b. FIG. 4a illustrates the arrangement of component parts of an extrusion assembly and a die member inserted in grooves formed therein assembled in an unclamped or unbolted condition, the space between the assembly parts 12 and 14 being on the order of about 0.001 to about 0.005 inches. When the assembly is clamped or bolted together, the sealing member tends to be compressed somewhat and, depending on the dimensions of the ribbon-shaped sealing member and grooves and the force applied to the narrow edges 42, there may also be some tendency of the sealing member to bow inwardly toward the fluid material chamber. At pressures commonly employed for polymer extrusion apparatus, i.e., less than 1,000 psi, the sealing system of the present invention functions quite effectively by contact of the narrow edges 42 and/or the outer surface or edge 44b of the sealing member with the bottoms 43 or outer surface 45, respectively, of the grooves. However, it appears that the improved effect attained by the bevel or chamfer at high pressures, i.e., above about 1,000 psi to about 3,000 psi, results from the pressure of the molten polymeric material which causes the sealing member to bow outwardly slightly at its center, as shown in FIG. 4b, so as to conform to the arch formed by the chamfer on each of the mating surfaces.

The endless ribbon-shaped sealing member and the endless grooves which are commensurate in shape to and accomodate the sealing member are generally arranged to surround and may be concentric with the fluid material chamber 22. Although in some instances it is preferred that the groove in which the endless sealing member is placed be immediately adjacent or essentially part of the fluid material chamber, i.e., a notch or V-shaped groove formed in a portion of the wall adjacent a mating surface, it is generally preferred that the endless sealing member and the grooves which accomodate the sealing member be arranged in spaced relation to the chamber.

The endless grooves 24 and 28 and the endless sealing member 26 which is commensurate in shape may have any shape with respect to the fluid material chamber 22 which they surround. Thus, they may have an annular or generally round orientation as well as an elliptical or an angular, such as rectangular or square, shape. The endless sealing member and grooves may also have a shape which departs from a regular shape, being provided with suitable bent or contoured regions to accomodate bolts or clamps which may pass through or around the upper and lower sections of the distributor assembly. Preferably, however, the continuous or endless sealing member and grooves are rectangular or square, as illustrated in FIG. 1.

The sealing member of finite or limited length and the endless sealing member are arranged such that the former sealing member overlaps and is in sealing contact with the latter sealing member. Preferably, the overlapped fit is one in which the opposed ends of the limited length sealing member 34 sealingly contact at least a portion of the outer surface at opposed positions of the endless sealing member. The extent of overlap is generally within the range of one-quarter to three-quarters of the width or widest cross-sectional dimension or surface 44 of the endless sealing member. Preferably, the overlap is about one-half the width of the endless sealing member. The grooves into which the sealing members fit are, as necessary, suitably shaped to accomodate the overlapping seal portions.

Although the foregoing discussion has been largely directed to the use of a T-shaped sealing system between components parts of systems in which a polymeric material, in solution or molten form, is being distributed, such as with a distributor block and component parts thereof and a melt-blowing die tip or a spin plate and/or a breaker plate, it should be understood that the sealing system of the present invention may be employed between mating surfaces, particularly where, such as here, at least one part has two or more mating surfaces which intersect one another and where the potential for leakage exists from fluid materials, particularly under very high pressures.

It should also be noted that, in some systems, the lower fluid material container section may comprise two superposed parts, such as a spin plate and a breaker plate. In such an instance, the preferred sealing system includes not only an endless sealing member between the mating faces of the upper and lower fluid material container sections and a sealing member in overlapping contact with the endless sealing member but also a second endless sealing member arranged in substantially the same manner in endless grooves in the mating surfaces of the superposed parts of the lower fluid material container section and of similar cross-sectional structure as the aforementioned endless sealing member.

We claim:

1. In a multiple component assembly for delivering a fluid material under pressure including:
    a lower fluid material container section having a cavity formed therein and at least one outlet orifice formed in an outlet surface of the lower fluid material container section and communicating with said cavity;
    an upper fluid material container section formed in at least two parts arranged in juxtaposed mating relationship and defining a cavity therein, one of said juxtaposed parts having a fluid material inlet in an inlet surface, said inlet communicating with the cavity in said upper fluid material container, said upper fluid material container section mounted in superposed mating relationship to said lower fluid material container section and the upper fluid material container cavity communicating with the lower fluid material container cavity to define a fluid material chamber;
    first sealing means provided between the mating surfaces of said lower fluid material container section and said upper fluid material container section surrounding said fluid material chamber; and
    second sealing means provided between each of said at least two parts of said upper fluid material container section adjacent the cavity in said upper fluid material container, the improvement comprising:
    said first sealing means comprising an endless ribbon-shaped sealing member having its narrow edge portions inserted in commensurately shaped endless grooves formed in each of said mating surfaces of said upper and lower fluid material container sections arranged surrounding said fluid material chamber; and
    said second sealing means comprising a ribbon-shaped sealing member of finite length having its narrow edge portions inserted in grooves formed adjacent the upper fluid material cavity in each of said mating surfaces of said at least two parts of said upper fluid material container section, each of said grooves in said first and second sealing means having a chamfer provided on an outer portion thereof, each end of said second sealing member overlappingly contacting said first sealing member to form a fluidpressure tight seal.

2. The multiple component assembly of claim 1 wherein said first and second sealing members have rectangular cross sections.

3. The multiple component assembly of claim 1 wherein said first and second sealing members are formed from aluminum.

4. The multiple component assembly of claim 1 wherein said first and second sealing members are oriented with their longer cross-sectional dimensions substantially perpendicular to the mating surfaces between which the sealing member is placed.

5. The multiple component assembly of claim 4 wherein each of said grooves has an outer surface and at least a portion of the outer surface of each of said grooves is perpendicular to the mating surface in which it is formed and each sealing member has an inner surface and an outer surface and at least a portion of said outer surface of at least one of said endless sealing member or sealing member of finite length contacts the portion of each of said endless grooves which is perpendicular to the mating surfaces in which it is formed.

* * * * *